(12) United States Patent
Anderson et al.

(10) Patent No.: US 6,877,753 B2
(45) Date of Patent: Apr. 12, 2005

(54) REEL SUPPORT AND DISPENSING CART

(75) Inventors: Jay L. Anderson, Cypress, TX (US); Wilbert Jolivette, Katy, TX (US)

(73) Assignee: Sumner Manufacturing Co., Inc., Houston, TX (US)

( * ) Notice: Subject to any disclaimer, the term of this patent is extended or adjusted under 35 U.S.C. 154(b) by 69 days.

(21) Appl. No.: 10/325,876

(22) Filed: Dec. 19, 2002

(65) Prior Publication Data

US 2004/0119256 A1 Jun. 24, 2004

(51) Int. Cl.[7] .................................................. B62B 1/00
(52) U.S. Cl. ............................... 280/47.28; 280/47.18; 280/47.19
(58) Field of Search ............................. 280/35, 47.131, 280/47.15, 47.17, 47.18, 47.19, 47.24, 47.27, 47.28, 47.29; 242/557, 403, 403.1

(56) References Cited

U.S. PATENT DOCUMENTS

| | | | | |
|---|---|---|---|---|
| 2,705,114 A | * | 3/1955 | Worsham .................. | 242/594.4 |
| 3,831,877 A | * | 8/1974 | Bennett et al. .......... | 242/594.3 |
| 3,856,230 A | | 12/1974 | Zimmer | |
| 4,391,422 A | | 7/1983 | McDonald | |
| 4,457,527 A | * | 7/1984 | Lowery .................... | 280/47.19 |
| 4,533,091 A | * | 8/1985 | Knight et al. ............ | 242/129.6 |
| 4,564,152 A | * | 1/1986 | Herriage .................. | 242/422.4 |
| 4,585,130 A | * | 4/1986 | Brennan .................... | 211/190 |
| 4,869,344 A | * | 9/1989 | Peterson .................... | 182/129 |
| 5,275,349 A | | 1/1994 | Tussing | |
| 5,308,012 A | * | 5/1994 | Fuller ........................ | 242/557 |
| 5,509,671 A | | 4/1996 | Campbell | |
| 5,577,745 A | | 11/1996 | Birk | |
| 5,887,819 A | * | 3/1999 | Korn et al. ............... | 242/599.3 |
| 5,915,646 A | * | 6/1999 | Campbell ................ | 242/594.4 |
| 6,601,859 B2 | * | 8/2003 | Durham ................. | 280/47.131 |
| 6,698,682 B1 | * | 3/2004 | Roderick .................... | 242/557 |

* cited by examiner

Primary Examiner—Christopher P Ellis
Assistant Examiner—Brian Swenson
(74) Attorney, Agent, or Firm—Douglas W. Rommelmann; Andrews Kurth LLP

(57) ABSTRACT

A manually operated wheeled reel support and dispensing cart for supporting multiple reels of material and for dispensing the material from the reels. The cart includes a cart frame having spaced side members, handles for manual cart handling and a top cross brace, with the frame being connected to a support plate and wheel assembly. A plurality of spindle hinge elements, each having a pivot opening, are fixed in spaced relation on one of the frame side members and receive L-shaped removable spindle elements for pivotal opening and closing movement. When open, the spindle elements are supported so that reels can be added or removed. When the spindle elements are closed they secure reels of material to the cart. The cart mechanism has a stop plate and a lock plate fixed to respective frame side members to ensure against inadvertent separation of the spindle elements from the cart and to ensure locking of the spindle elements at their closed positions. The frame is also provided with storage lock plates and spindle storage rings for storing and securing spindles that have been removed from their spindle hinge elements.

22 Claims, 6 Drawing Sheets

REEL SUPPORT AND DISPENSING CART

BACKGROUND OF THE INVENTION

1. Field of the Invention

The present invention pertains generally to wire dispensing carts, which are typically two wheeled manually manipulated carts having the facility for support of multiple reels of wire, typically electrical wire, and also arranged for rotation of the wire storage reels during dispensing of wire therefrom. More particularly, the present invention concerns a two wheeled manually operated cart having a plurality of removable spindles which are pivotally mounted to move between an open position for assembly or removal of wire storage reels and a closed position for securing the wire storage reels. More specifically, the cart has the facility for locking the pivotally mounted spindles in the closed position and for securely storing the spindles when they are removed from pivotal assembly with the cart mechanism.

2. Description of the Prior Art

Various types of wheel mounted wire reel or spool carriers or carts have been in extensive use for a number of years. Reels or spools of material such as wire, particularly electrical wire and cable are supported by such spool carriers or carts in a manner permitting the cart to be transported to an intended site and permitting the wire of the reels to be dispensed from the reels as needed. Typically the carts are provided with spindles on which the wire reels are rotatably mounted so that the wire can be payed out end-wise from the reels.

The spindles may be fixed to the cart structure or may be removable from the cart structure and may be retained to the cart mechanism by resting the ends of the spindles in notches or pockets provided therefor or by temporarily securing the spindles to the cart structure by means of cotter pins or latches. In almost every case, the spindles of wheel mounted wire reel or spool carriers or carts are removable from the frame structure of the cart for assembly or disassembly of wire spools to or from the spindles. When the spindles are separated from the cart structure, they frequently become lost or damaged and thus must be replaced. Obviously, loss of one or more of the spindles of a wire cart causes the cart to be less than completely operative until the missing spindle has been replaced. It is desirable therefore, to provide a wheel mounted wire reel or spool carriers or cart having spindles that are moveable between open and closed positions to permit assembly and disassembly of wire reels, without the risk of one or more of the spindles becoming separated from the cart mechanism and lost or damaged. It is also desirable to provide a wire spool carrier or cart having spool mounting spindles that can be separated from operative position on a cart and which are securely receivable by a storage mechanism of the cart so that the spindles cannot become inadvertently separated from the cart mechanism when not in operative use or operative position.

Loading of spools to the spindles of wheel mounted wire reel or spool carriers or carts or separation of the spools from the spindles is often a difficult task for workers because both ends of the spindles must be supported as the rather heavy wire reels are assembled or disassembled. Then, after the reels have been assembled to a spindle the spindle, which may be heavy with several wire reels, the heavy and awkward reel supporting spindle must be assembled to the frame structure of the cart and secured thereto. The use of slots or pockets to receive the ends of the removable spindles is beneficial, as compared to securing the ends of the spindles with cotter pins or other locking mounts, but if the cart should fall over then several of the wire supporting spindles can become inadvertently separated from the cart. It is desirable therefore to provide a wheel mounted wire reel or spool carriers or cart having a locking mechanism which positively retains the spindles in operative position with the cart mechanism and ensures against inadvertent opening or separation of the spindles, regardless of the condition of the cart. It is also desirable to provide a wheel mounted wire reel or spool carrier or cart having a spindle positioning mechanism which permits secure and stable positioning of pivotally supported spindles to enable a worker to assemble wire reels to the spindles or remove wire reels from the spindles.

SUMMARY OF THE INVENTION

It is a principle feature of the present invention to provide a novel wheel mounted wire reel or spool carrier or cart having a plurality of spindles for rotationally supporting a plurality of wire reels and which is removably pivotally mounted to the cart structure and positionable at an open position for assembly and disassembly of wire reels thereto and a closed and locked position at which each spindle is secured against inadvertent opening.

It is another feature of the present invention to provide a novel wheel mounted wire reel or spool carrier or cart having a plurality of wire reel support spindles which have a stabilized open position to maintain spindles substantially immovable and thus permit workers to accomplish assembly and disassembly of wire reels in simple and efficient manner, while the spindle is in pivotal assembly with the cart structure.

It is an even further feature of the present invention to provide a novel wheel mounted wire reel or spool carrier or cart having a plurality of wire reel support and dispensing spindles, each of which is secured to the cart structure by a pivotal support so that the spindles are each mounted for pivotal movement between an open position permitting wire reels to be assembled to and removed from the spindles and a closed and locked position, where the spindles are secured in a position ensuring against inadvertent opening of the spindles and ensuring that wire reels supported thereby are not capable of inadvertent separation from the spindles.

It is also a feature of the present invention to provide a novel wheel mounted wire reel or spool carrier or cart having a spindle storage capability to maintain unused and separated spindles in stored assembly with the cart mechanism to ensure against inadvertent separation and loss thereof.

Briefly, the various objects and features of the present invention are effectively realized through the provision of a two wheeled manually operated wire reel support and dispensing cart having a frame structure with handles for manual operation and wheels for movement of the cart to intended work sites. The frame structure of the cart incorporates a pair of generally parallel side members, one of the side members having a plurality spindle hinge pivot mounts fixed at spaced locations along the length thereof. The shorter ends of L-shaped spindles are releasably supported by the hinge pivot mounts for pivotal movement of the spindles from an open position, permitting reels of wire to be assembled to or removed from the spindles, to a closed and locked position where the reels of wire are secured against inadvertent separation from the spindles. The side members are provided, respectively, with a rear stop plate and a rear lock plate, which are fixed to the side members by bolt and nut assemblies. The rear stop plate is provided with a plurality of recesses through which portions of the spindles extend when the spindles are in their closed positions. The rear lock plate defines a plurality of locking receptacles for receiving the free ends of the spindles and each having a hook-like locking projection for securing the end of a respective spindle against opening movement. At the upper ends of the rear stop plate and the rear lock plate are provided spindle storage rings or eyes which are integral, respectively, with the rear stop plate and a rear lock plate. When a spindle or more than one spindle are separated from the pivot mount therefor, the separated spindle can be inserted through the storage rings or eyes. A storage lock plate, being pivotally mounted to the rear stop plate and a rear lock plate can then be moved to a position locking the spindles within the storage rings of eyes. This feature prevents separated spindles from becoming lost or damaged after being separated from pivotal assembly with the spindle hinge pivot mounts.

BRIEF DESCRIPTION OF THE DRAWINGS

So that the manner in which the above recited features, advantages and objects of the present invention are attained and can be understood in detail, a more particular description of the invention, briefly summarized above, may be had by reference to the preferred embodiment thereof which is illustrated in the appended drawings, which drawings are incorporated as a part hereof.

It is to be noted however, that the appended drawings illustrate only a typical embodiment of this invention and are therefore not to be considered limiting of its scope, for the invention may admit to other equally effective embodiments.

IN THE DRAWINGS

Figure 1:
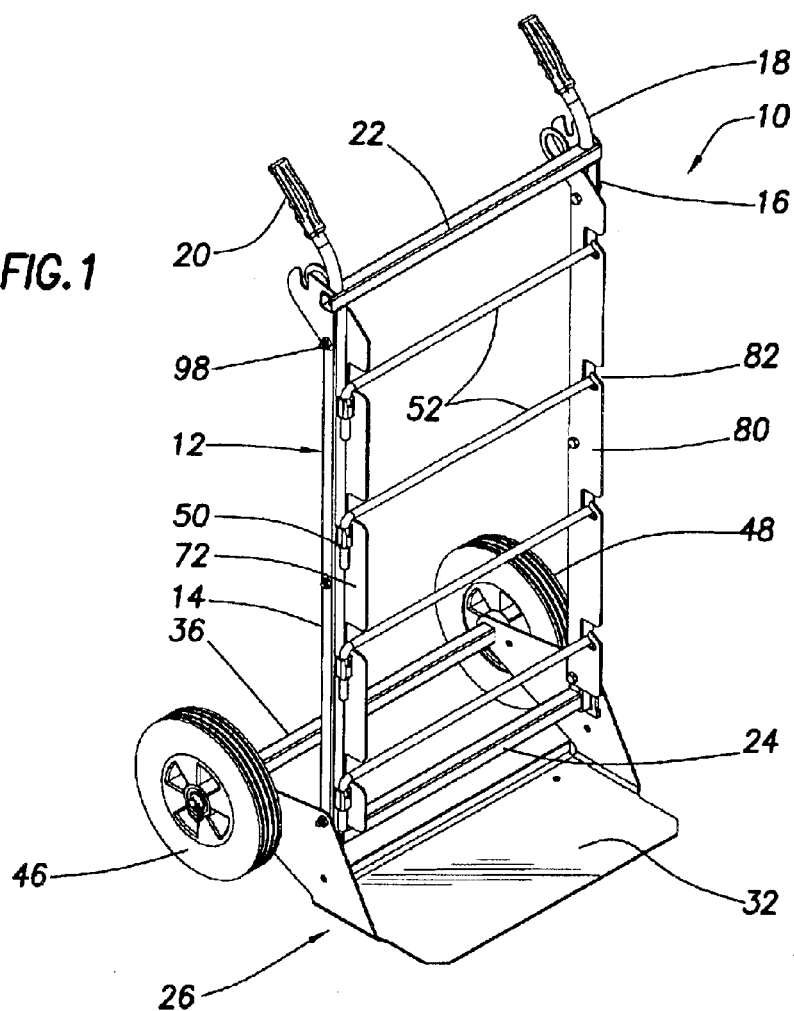
Figure 3:
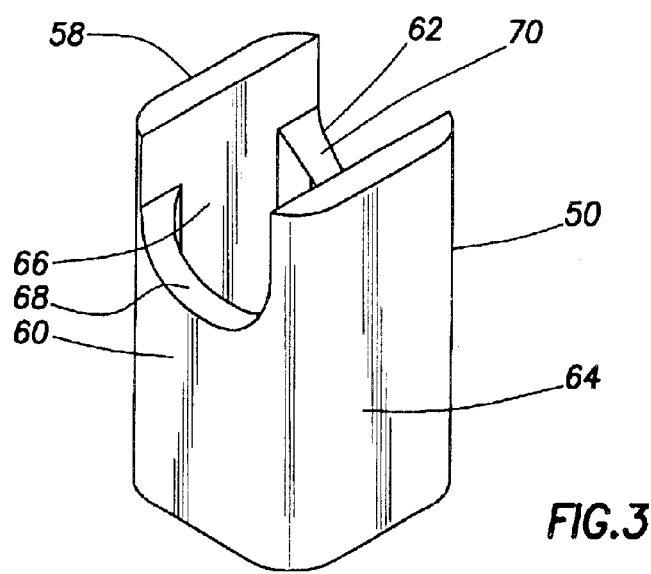
Figure 2:
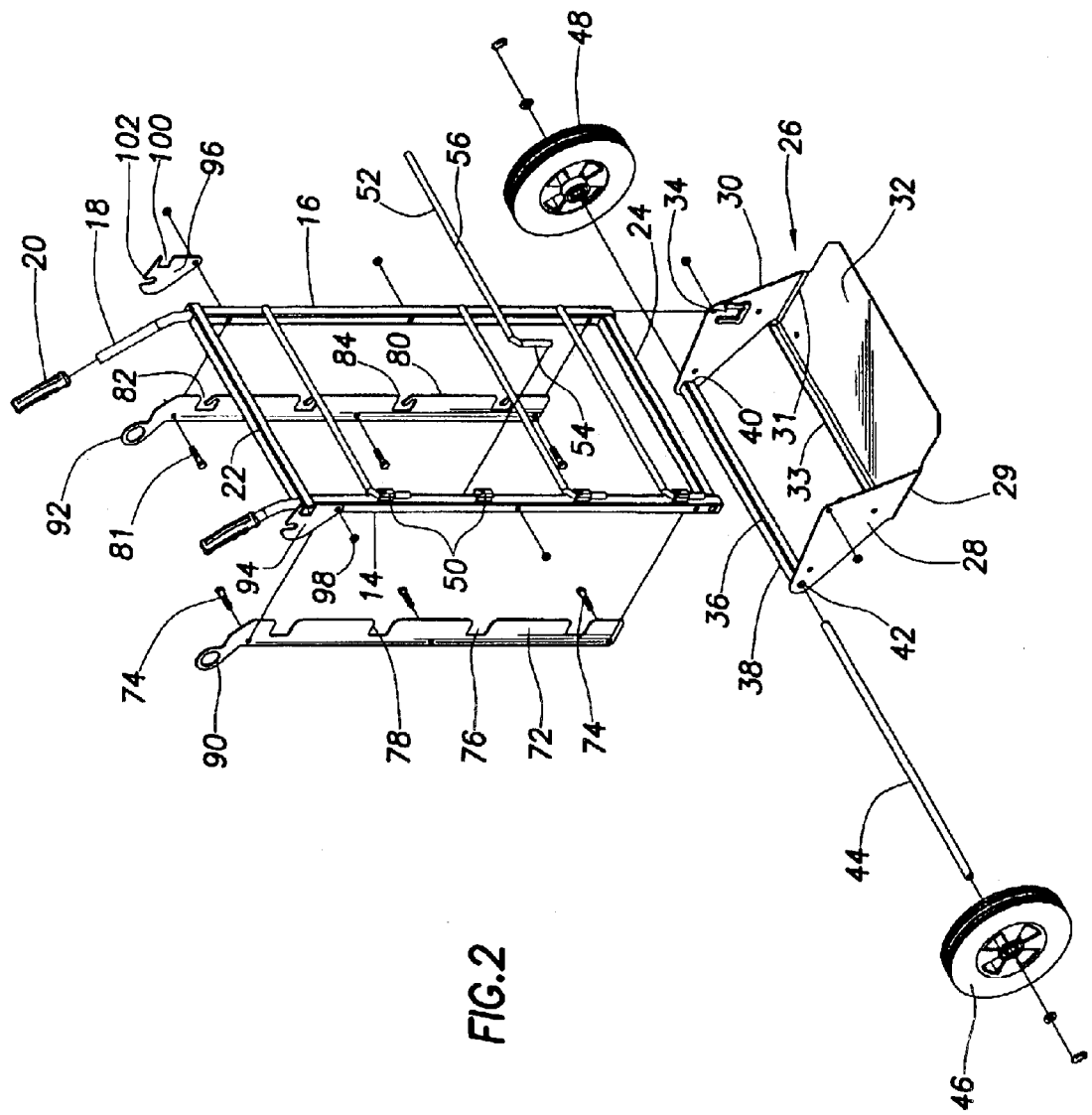
Figure 4:
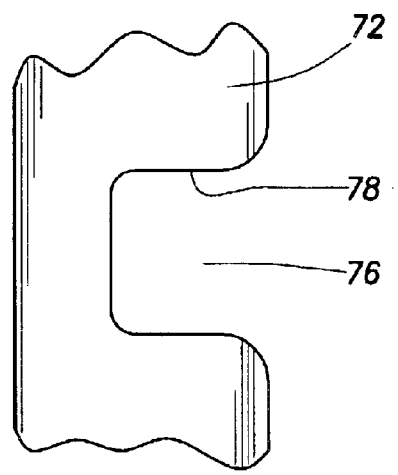
Figure 5:
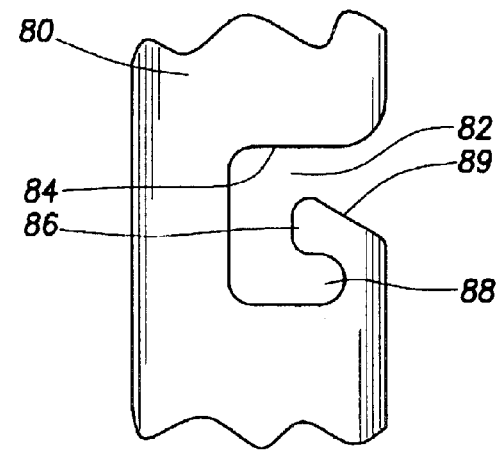
Figure 6:
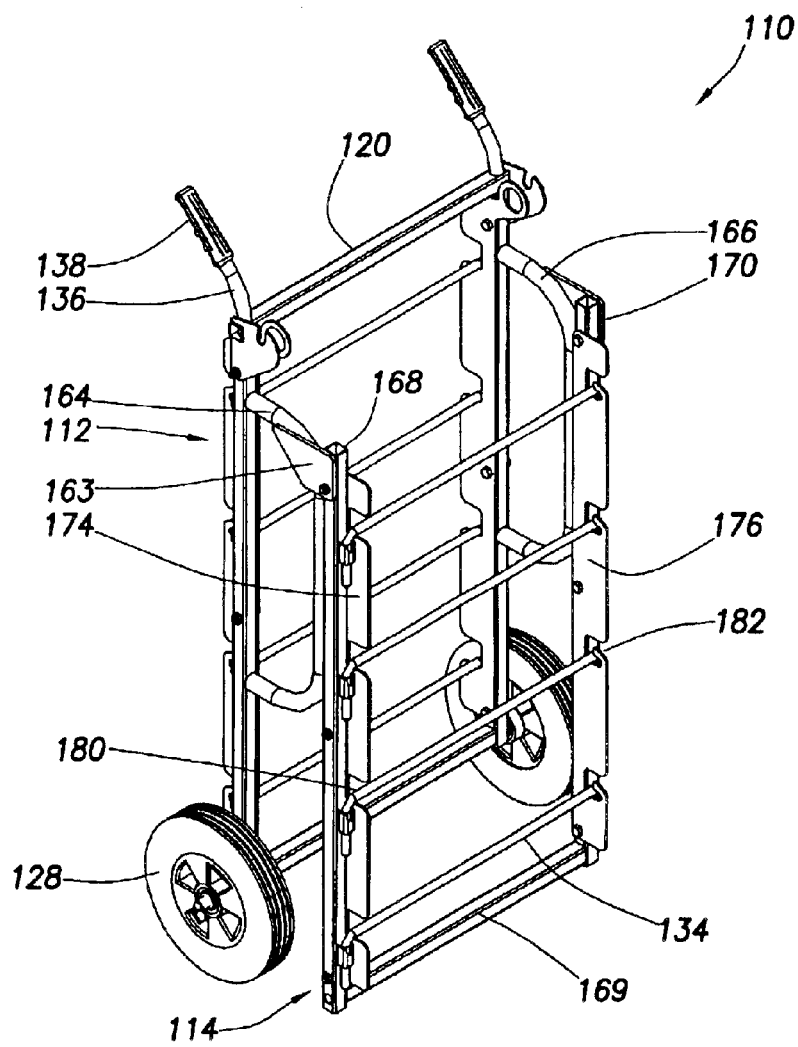
Figure 7:
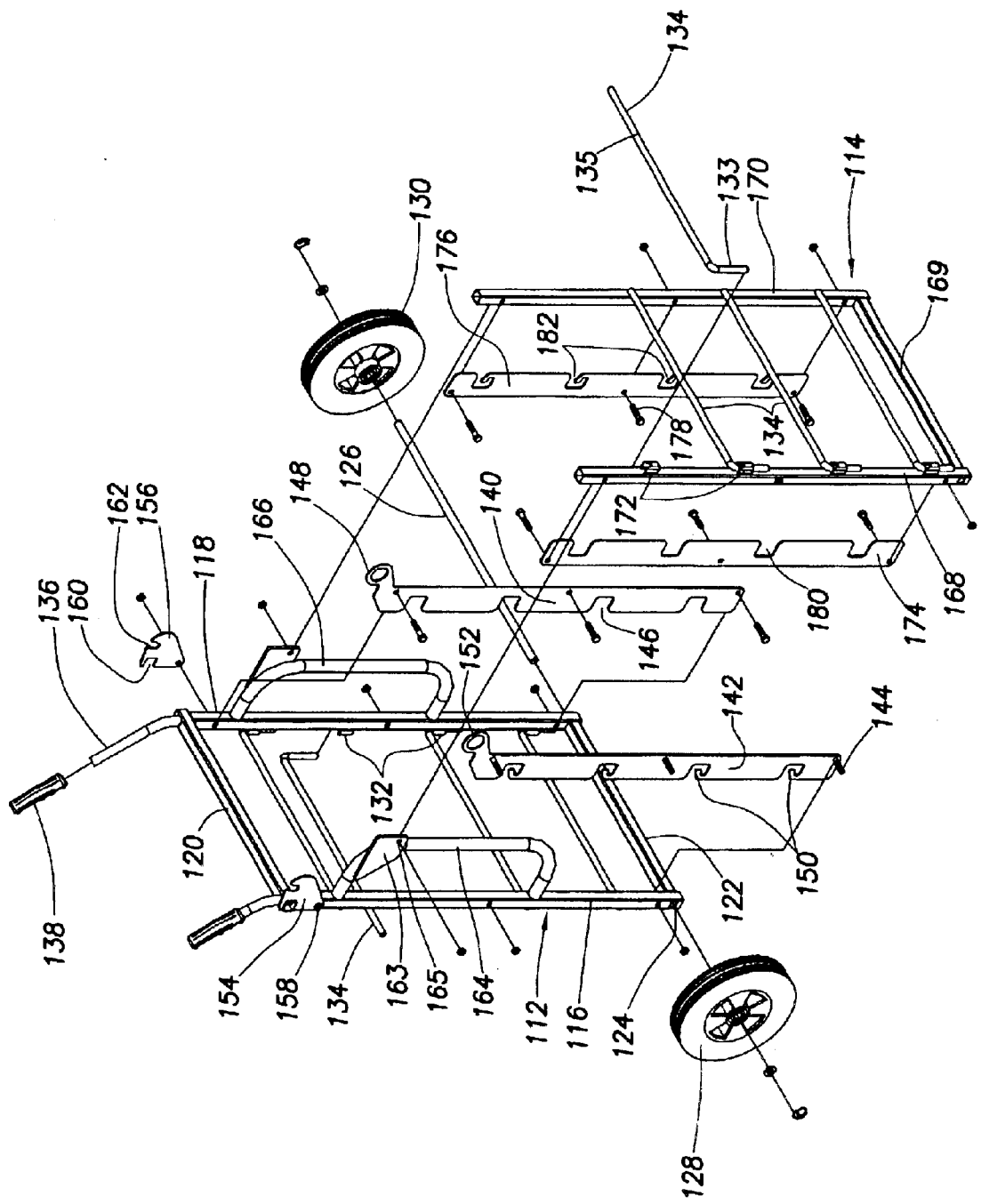
Figure 8:
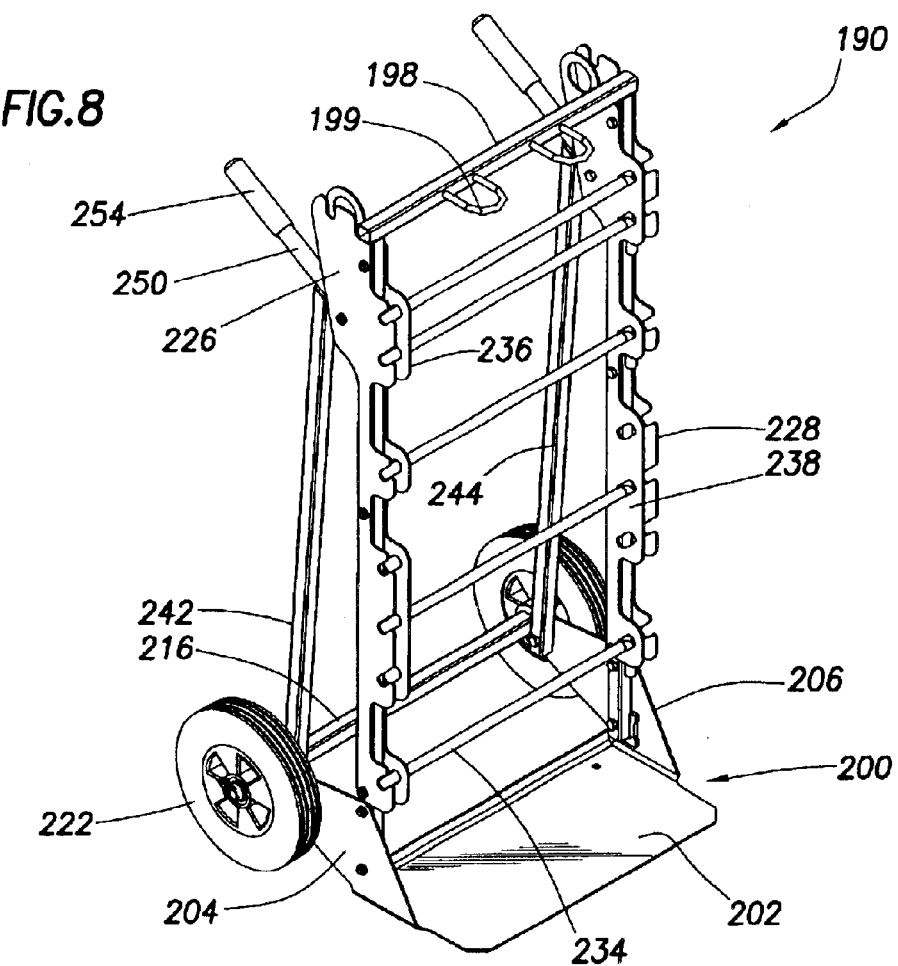
Figure 10:
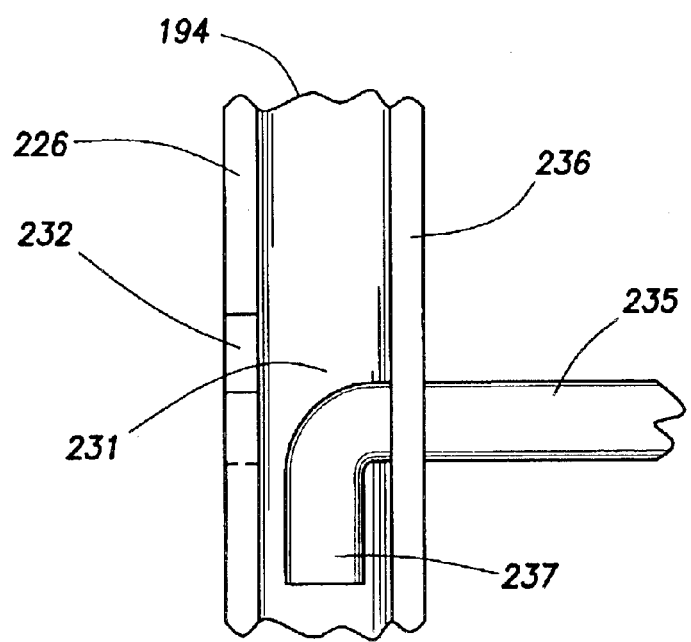
Figure 9:
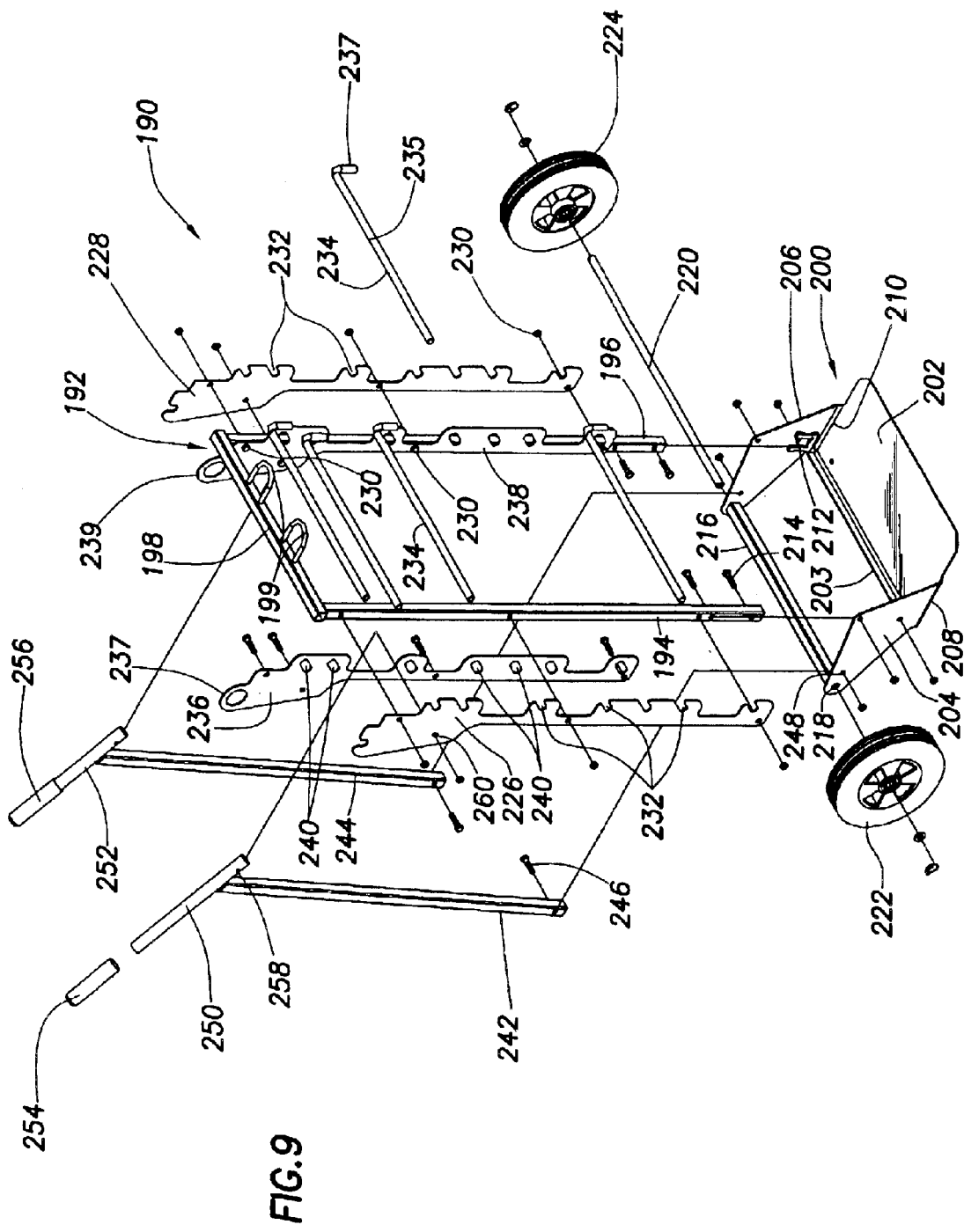

FIG. 1 is an isometric illustration of a manually operated wheel mounted reel support cart embodying the principles of the present invention and representing one of the embodiments of the present invention;

FIG. 2 is an exploded view of the manually operated wheel mounted reel support cart of FIG. 1 and illustrating the various components thereof in detail;

FIG. 3 is an isometric illustration of one of the spindle hinge pivot mounts of FIGS. 1 and 2, illustrating the geometry thereof in detail;

FIG. 4 is a fragmentary elevational illustration showing a portion of the stop plate of the embodiment shown in FIGS. 1–3;

FIG. 5 is a fragmentary elevational illustration showing a portion of the locking plate of the embodiment shown in FIGS. 1–3;

FIG. 6 is an isometric illustration of a wire support and dispensing cart representing an alternative embodiment of the present invention and having primary and secondary frame structures which are pivotally connected and permit the cart to be positioned in step-ladder like fashion for stabilized positioning for wire reel orientation and wire dispensing;

FIG. 7 is an exploded isometric illustration of the wire support and dispensing cart of FIG. 6 showing the relationships of the various components thereof in detail;

FIG. 8 is an isometric illustration of a wire support and dispensing cart representing a further alternative embodiment of the present invention and having a spindle retention system requiring the spindles to be moved in predetermined manner before they can be released for removal and thereby enhancing spindle retention even when the cart is subjected to rough handling; and FIG. 9 is an exploded isometric illustration of the wire support and dispensing cart of FIG. 8 showing the relationships of the various components thereof in detail;

FIG. 10 is a partial elevational view of one of the frame side members and the spaced spindle lock and slide plates and showing a short spindle retainer section of a spindle being positioned between the plates.

DETAILED DESCRIPTION OF PREFERRED EMBODIMENT

Referring now to the drawings and first to FIGS. 1–5 a manually operated wheel mounted reel support cart embodying the principles of the present invention is shown generally at 10 and incorporates a cart frame shown generally at 12 having a pair of frame side members 14 and 16 which are disposed in substantially parallel relation. Handle members 18 extend from the upper ends of the respective frame side members and are provided with hand grip elements 20, which may be composed of a suitable polymer material, rubber or any rubber-like material to permit manual handling of the cart by a worker for moving or positioning the cart. The generally rectangular cart frame 12 is provided with top and bottom cross braces 22 and 24 which are typically welded to the frame side members, but which can be secured to the side members in any other suitable fashion. The frame side members 14 and 16 and the top and bottom cross braces 22 and 24 are preferably composed of metal tubing of generally rectangular cross-sectional configuration. It should be borne in mind, however, that the use of rectangular tubing is not intended to restrict the spirit and scope of the present invention in any manner and that tubing of any other cross-sectional configuration may be used to define the frame structure.

A support plate and wheel assembly shown generally at 26 is mounted to the lower end of the cart frame 12. The support plate and wheel assembly is generally formed from flat metal stock with side sections 28 and 30 being bent upwardly at 29 and 31 from a central section which defines a support plate 32. The central section or plate 32 is bent at its rearmost portion to define an upstanding shoulder 33 which prevents objects being lifted by the plate or platform 32 from sliding off the central section or plate 32 as the plate is tilted during lifting activity. The side sections 28 and 30 are secured to respective side members 14 and 16 by bolt and nut assemblies or by any other suitable means. For fitting the frame and side members for assembly, the side members 28 and 30 are each provided with generally U-shaped frame supports 34 which are typically fixed to the side members by welding or by any other suitable means of attachment. The U-shaped configuration of the frame supports permits the lower ends of the rectangular frame side members 14 and 16 to have reasonably close fitting relation within the central opening or recess of the frame supports 34. Further, the fit of the lower ends of the frame side members ensures efficient force transition between the cart frame 12 and the plate and wheel assembly of the cart mechanism.

The upstanding and generally parallel related side sections 28 and 30 project upwardly and rearwardly from the support plate 32 and the lower portion of the cart frame 12 and provide support for an axle tube 36 having ends 38 and 40 that are disposed in engagement with inside surfaces of the side sections 28 and 30. The axle tube is located in laterally offset relation with and to the rear of the lower portion of the cart frame 12 so that wheel assemblies of the cart mechanism are located for efficient manual manipulation of the cart. The ends of the axle tube may be fixed to the inside surfaces of the side sections 28 and 30, such as by welding or by any other suitable means of attachment. In the alternative, the ends of the axle tube may simply be maintained in place between the side sections to maintain proper spacing of the side sections. The side sections 28 and 30 are punched or drilled to define axle holes 42 which are in registry with the passage through the axle tube as shown in FIG. 2, through which an axle member 44 extends. Wheel assemblies 46 and 48 are connected to respective ends of the axle 44 and are located outboard of the respective side sections 28 and 30 of the support plate and wheel assembly 26.

A plurality of spindle hinge elements 50 are mounted in spaced location along the length of the frame side member 14 and define pivot or hinge supports for a plurality of spindle elements 52. Each of the spindle elements is of L-shaped configuration having a short pivot section 54 and a longer reel support section 56 which are each preferably of circular cross-sectional configuration, being composed of circular bar stock. The bar stock is bent intermediate its length to form the short pivot section 54 and the longer reel support section 56. Each of the spindle hinge elements 50 is of the configuration shown in detail in the isometric illustration of FIG. 3 and has a support wall structure 58 for connection to the frame side member 14 by welding or by any other suitable means of attachment that fixes the spindle hinge elements 50 to the frame side member. The spindle hinge elements 50 are of tubular construction, typically being formed from rectangular tubular bar stock, and have side walls 58 and 64, a front wall 60 and a rear wall 62. The walls are of dimensions defining a generally rectangular internal opening 66 within which the short pivot section 54 of the spindle elements is received in close fitting pivotally rotatable relation. With the short pivot sections of the spindles received within the pivot openings 66, the short pivot sections will be permitted to rotate within the pivot openings, assuming that such pivotal movement is not prevented by other structure of the spindle hinge elements or by other structure of the cart mechanism. The front and rear walls 60 and 62 of the spindle hinge elements 50 are machined or otherwise formed to define spindle positioning recesses 68 and 70, which are preferably of arcuate configuration, corresponding to the circular cross-sectional geometry of the spindle elements 52. It should be borne in mind however, that the arcuate or curved surfaces of the spindle positioning recesses 68 and 70 may be of any other suitable geometry that permits restriction of spindle rotation at desired spindle positions. To permit loading of a spindle with one or more reels or spools of wire, after having been unlocked from the cart frame, the spindle is rotated approximately 90° within the central opening or pivot receptacle 66 until the bend of the spindle and a portion of the longer, horizontal reel support section 56 of the spindle element 52 are in registry with the arcuate recess 68 of the front wall 60 of the spindle hinge element 50. When the arcuate recess 68 is reached, the spindle will be moved downwardly by gravity into the arcuate recess. At this point the longer, reel support section 56 of the spindle will be projecting forwardly from the cart frame and will be stabilized against rotational movement by the arcuate recess 68. In this position of the spindle element, reels or spools of wire may be assembled to or removed from the spindle. The spindle will remain at this forwardly projecting position until it is lifted from the arcuate recess 68 sufficiently to clear the upper extent of the side wall structure and rotated back to its closed position.

It is desirable to lock the spindle elements of the cart mechanism at their closed positions and thus ensure against the loss of any of the wire reels or spools that are supported by any of the spindle elements from the cart mechanism, regardless of the position of the cart mechanism. To accomplish this feature, a stop plate 72 is fixed to the frame side member 14 by bolts or bolt and nut assemblies 74, with the bolts thereof extending through holes in the side member and through corresponding holes of the rear stop plate. The stop plate 72, as shown best in FIG. 2, defines a plurality of generally rectangular recesses 76 through which the longer, horizontal sections 56 of the spindle elements 52 extend when the spindle elements are positioned at the closed or substantially closed positions thereof. The rectangular recesses 76 are defined in part by stop shoulders 78 that prevent the spindle elements, when closed, from being raised sufficiently that the short pivotal section thereof can move upwardly and be separated from the internal opening 66 of the spindle hinge element. A rear lock plate 80 is fixed to the frame side member 16 by bolts or bolt and nut assemblies 81 and defines a plurality of spindle locking recesses 82 which receive the free ends of the longer reel or spool supporting sections 56 at the closed positions of the spindle elements 52. The locking recesses 82 are defined in part by upper stop shoulders 84 which restrict upward movement of the longer reel or spool supporting sections 56 when the spindle elements are closed. The locking recesses 82 are also defined in part by hook-like spindle retainer elements 86 of the rear lock plate 80 which serve to secure the spindle elements against upward movement when the spindles have been moved into bottom recess portions 88 of the locking recesses 82. The hook-like elements 86 also define angulated outer guide edge portions 89 which serve to guide the free ends of the spindle elements into the locking recesses 82 as the spindle elements are pivotally moved to the closed and locked positions thereof.

The shorter pivotal sections 54 of the L-shaped spindle elements 52 are merely pivotally received by the spindle hinge elements and thus can be easily removed simply by rotating them from the closed and locked positions to positions clear of the stop shoulders 78 of the rear stop plate 72, and then lifting them to disengage the short pivot sections 54 from the central passage or receptacle 66 of the respective spindle hinge elements 50. Removal of one or more of the spindle elements in this fashion will permit larger reels or spools of wire or other elongate material to be rotatably supported by one or more of the spindle elements. If a spindle element is rotated approximately 90° from the closed position to a forwardly projecting position, a portion of the spindle element will be received by the spindle positioning recess 68, thus stabilizing the spindle against further rotational movement. At this forwardly or laterally projecting stabilized position reels or spools may be assembled to and removed from the spindle, without necessitating manual spindle positioning control. Thus, a worker can easily add or remove spools or reels of wire or other material without having to manually stabilize spindle movement. To then pivot the spindle from this forwardly projecting stabilized position, it is necessary to lift the spindle slightly so that the spindle is moved clear of the positioning recess. To then move the spindle to its closed position, the spindle is simply rotated until the free end of the longer spindle section 56 moves into its respective locking recess 82.

When the spindle elements are removed from the cart mechanism they can become lost or, if they are left lying on a floor surface, the removed spindle elements can be damaged by other equipment being used at the construction site. It is desirable, therefore, to provide the cart mechanism with a spindle storage facility to enable spindle elements that have been removed from the spindle hinge elements to be maintained in protected storage on the cart mechanism. One suitable means for accomplishing this desired feature is accomplished by spindle storage rings 90 and 92 which are formed integrally with the upper end portions of the rear stop plate 72 and the rear lock plate 80. Since the rear stop plate 72 and the rear lock plate 80 are fixed to the inner surfaces of the frame side members 14 and 16, the plates 72 and 80 and thus the spindle storage rings 90 and 92 are spaced less than the length of the reel support sections 56 of the spindle members 52. Thus, the reel support sections 56 of the spindle members are stored by locating them within the openings of the spindle storage rings 90 and 92. To secure the stored spindle members within the spindle storage rings a pair of storage lock plates 94 and 96 are secured to the upper outer portions of the frame side members 14 and 16 by bolts 98. The storage lock plates 94 and 96 each define rectangular slots 100 which receive end portions of the upper cross brace 22 therein when the storage lock plates are positioned as shown in FIGS. 1 and 2. The storage lock plates 94 and 96 also each define spindle retention slots 102 that receive the free ends of spindle element being retained within the spindle storage rings and thus assist in retaining the stored spindle elements against substantial movement during storage thereof as the cart mechanism is manually moved from place to place. The spindles are loaded into the spindle storage area by aligning the short bend with the slot in the locking plate, sliding into storage rings and rotating.

Referring now to FIGS. 6 and 7, an alternative embodiment of the manually operated wire reel or spool handling and dispensing cart is shown generally at 110 and incorporates a primary cart frame structure shown generally at 112 and a secondary cart frame structure shown generally at 114. The primary cart frame structure is defined by a pair of frame side members 116 and 118 that are disposed in generally parallel relation and are interconnective respectively with an upper cross brace 120 and a lower cross brace 122. Preferably the upper and lower cross braces are connected to the side members by welding but can be connected in any other suitable fashion without departing from the spirit and scope of the present invention. The lower cross brace 122 is of tubular construction, being composed of a length of tubing having a rectangular cross-sectional configuration. Axle openings 124 are formed through the lower ends of the frame side members 116 and 118 and are in registry with a passage that is defined by the tubular cross brace 122. An axle 126 extends through the axle openings 124 and through the tubular cross brace passage and provides support for a pair of wheel assemblies 128 and 130.

The frame side member 118 is provided with a plurality of spindle hinge elements 132 which are disposed in spaced relation along the length of the frame side member. The spindle hinge elements are welded or otherwise fixed to the frame side member 118 and are preferably of the configuration and purpose discussed above in connection with FIG. 3. A plurality of spindle elements 134 are each of L-shaped configuration as discussed above in connection with FIGS. 1 and 2 and are pivotably supported by spindle hinge elements in the manner discussed above. For manual operation of the wire reel or spool support and dispensing cart 110, handle elements 136 are welded or otherwise fixed to the primary frame structure 112 and are provided with hand grips 138 to enable manual manipulation of the cart mechanism. A rear stop plate 140 and a rear lock plate 142 are each secured to respective frame side members 118 and 116 respectively by mounting bolt and nut assemblies 144 and may be of similar configuration as the rear stop plate 72 and the rear lock plate 80 of FIGS. 1 and 2. The rear stop plate 140 defines a plurality of generally rectangular recesses 146, being similar in geometry and purpose as compared with the recess 76 of the stop plate 72 of FIG. 4. The rear stop plate 140 also defines a spindle storage ring 148 which is integral with its upper end and which provides for storage of spindles that have been removed from their respective spindle hinge elements as discussed above. The rear lock plate 142 defines a plurality of locking recesses 150 which are preferably of the configuration and purpose that is shown in detail in FIG. 5. The rear stop plate 140 and the rear lock plate 142 are each fixed to internal surfaces of the frame side members 116 and 118 so that the spacing of the plates 140 and 142 is less than the horizontal length of the spindle elements 134. The rear stop plate 140 permit pivotal rotation of the respective spindle elements 134 between open and closed positions thereof, but permit raising of the spindle elements to disengage them from the respective spindle hinge elements 132 only when the spindle elements have been pivoted sufficiently to clear the upper stop shoulders of the respective spindle recesses 146. The rear lock plate 142 also defines a spindle support ring 152 at its upper end so that spindle elements being stored are received by both of the spindle storage rings 148 and 152.

A pair of lock plates 154 and 156 are secured to the respective frame side members 116 and 118 by bolts 158 and function in the same manner as lock plates 94 and 96 of FIG. 2. The lock plates 154 and 156 are each provided with rectangular recesses 160 to receive end portions of the rectangular upper cross brace 120 at the closed positions of the lock plates. The lock plates are also provided with spindle recesses 162 to receive at least a portion of one of the spindles during storage of the spindles in the locking rings to thus minimize movement of the stored spindles as the wheeled storage and dispensing cart is utilized.

To provide for additional storage of reels or spools of wire and other elongate material a pair of stand-off elements 164 and 166 are of generally U-shaped configuration, with respective ends thereof being fixed to the respective frame side members 116 and 118 as shown in FIGS. 6 and 7. The secondary cart frame structure shown generally at 114 is pivotally mounted to the stand off elements 164 and 166. A pair of frame hinge plates 163 are welded or otherwise fixed to the standoffs 164 or 166 and each have a pivot hole 165, as shown in FIG. 7, having a bolt and nut assembly therein for pivotally connecting the upper ends of secondary frame side members 168 and 170 to the standoffs. This feature permits pivotal movement of the secondary frame relative to the standoffs and thus permits relative pivotal movement of the primary and secondary frame structure. Thus, the secondary frame structure is pivotally movable relative to the primary frame structure and thus can be located in angulated relation with the primary frame structure. This arrangement permits the primary and secondary frame structures to be positioned much like the frames of a step ladder, to form a stable wire reel support and to locate the wire reels supported by the spindles to permit the wire to be easily and controllably pulled from the reels.

The secondary frame side members 168 and 170 are also provided with a plurality of spindle hinge elements which may be similar to or identical with the spindle hinge elements 132 and which provide pivotal support for a plurality of spindle elements 134. A front stop plate 174 and a front lock plate 176 are fixed by bolt and nut assemblies 178 to the respective frame side members 168 and 170 of the secondary frame structure 114. The plates 174 and 176 are fixed to the inner surfaces of the respective frame side members 168 and 170 so that the spacing of the front stop and lock plates is less than the length of the horizontal or longer sections of the spindles 134. The front lock plate defines spindle recesses 180 which may be identical to the spindle recesses 146 of the rear stop plate 140. The rear lock plate 176 defines a plurality of locking recesses 182 which may be identical to the locking recesses 150 of the rear lock plate 142. The primary and secondary frame assemblies 112 and 114 each provide rotation controlling support for a plurality of spindle elements, with each of the spindle elements being adaptive to retain one or more reels or spools of wire or other elongate material.

Referring now to FIGS. 8 and 9 a further alternative embodiment of the present invention is shown generally at 190 and includes a cart frame shown generally at 192 which is defined by a pair of generally parallel, spaced frame side members 194 and 196 and a top cross brace 198 which is welded or otherwise fixed to the upper ends of the frame side members. The frame side members and the top cross brace are preferably composed of tubular stock of rectangular cross-sectional configuration. A support plate and wheel assembly shown generally at 200 includes a support plate 202 having side sections 204 and 206 extending upwardly and rearwardly therefrom. Preferably, the side sections 204 and 206 are integral with the support plate 202, being formed from a flat sheet of plate stock that is bent at 208 and 210 so that the support plate 202 is of generally rectangular configuration and the side sections 204 and 206 are essentially of triangular configuration and extend upwardly and rearwardly from the support plate. The rear portion of the support plate is bent upwardly to define a retainer flange 203 that restrains objects from sliding off of the rear portion of the support plate when the cart is tilted on its wheel assemblies for movement. A pair of frame support elements 212 are welded or otherwise fixed to the interior surfaces of the side sections 204 and 206 and define a generally rectangular recess within which the lower ends of the frame and side members 194 and 196 are received. Bolt and nut assemblies 214 extend through connection apertures in the frame side members and side sections 204 and 206 of the support plate and wheel assembly 200 and thus secure the cart frame to the support plate and wheel assembly. Although bolted connection of these assemblies is preferred, it should be borne in mind that these assemblies may be interconnected by welding or by any other suitable means of connection.

An axle tube 216, also composed of generally rectangular tubular stock is mounted between rearwardly projecting portions of the side sections 204 and 206. Axle openings 218 are defined in the side sections and in registry with the central passage of the axle tube 216. An axle member 220 extends through the axle tube and axle openings 218 and provides support for a pair of wheel assemblies 222 and 224. The upward and rearward projection of the side sections 204 and 206 locates the axle tube and thus the axle and wheel assemblies rearwardly of the generally rectangular cart frame 192 and permits the support plate 202 to rest on a floor surface when the cart frame is oriented substantially vertically.

A pair of spindle lock plates 226 and 228 are mounted in fixed relation to outside edge surfaces of respective frame side members 194 and 196 by bolt and nut assemblies 230 so that the spindle lock plates are disposed in fixed relation with respect to the frame side members. The spindle lock plates define a plurality of angulated elongate slots 232 that open forwardly and are angulated upwardly as is evident from FIG. 9. These forwardly opening angulated slots are of a dimension for receiving portions of one of a plurality of spindle elements 234. The spindle elements 234 have an elongate reel support section 235 and a short spindle positioning and retainer section 237 being oriented in angular relation with the reel support section. If desired, the spindle elements 52 shown in FIG. 1 and the spindle elements 234 may be substantially identical, but preferably the spindles 234 are composed of larger diameter material of greater load supporting capacity. In the case of the FIG. 8 embodiment of the present invention, however, the spindle elements are not supported by the cart frame structure 192 for pivotal movement, but yet are releasably supported by the frame structure for removal therefrom as desired.

A pair of spindle slide plates 236 and 238 are also mounted in fixed relation to the inside edges of the frame side members 194 and 196 by the bolt and nut assemblies 230, by welding or by any other means. The spindle slide plates 236 and 238 define a plurality of angulated openings 240 that are also adapted to receive portions of the spindle elements 234. With the stop plates and spindle slide plates fixed respectively to the inner and outer walls of the rectangular frame side members 194 and 196 a spindle retention channel 231, of greater width than the cross-sectional width of the short spindle retainer section 237 is defined between each of the stop plates and each of the spindle slide plates as shown in the fragmentary elevational view of FIG. 10. The short spindle retainer sections 237 of the spindle elements 234 are received within this spindle retention channel so that linear movement of the spindle is restricted by the stop plates and spindle slide plates to assist in preventing the spindles from being inadvertently separated from the cart frame structure as the cart is subjected to jarring and vibration during its movement along uneven surfaces, up and down stairs or when the cart may fall over due to inattention by the user personnel. As is evident from FIG. 10, for the spindle element to be released from its interlocked relationship with the cart frame structure it must be rotated to orient the short pivotal section in aligned registry with the inclined forwardly opening slot 232. The spindle element must be raised and then be moved laterally while remaining horizontally oriented, such that the spindle element is caused to slide along the respective inclined or angulated slots 232 and openings 240 of the lock plates 226 and 228 and the spindle slide plates 236 and 238 to position the spindle element for endwise or linear removal from the cart frame structure. The spindle to be assembled or removed must be positioned so that the short spindle retainer section 237 will pass through the angulated slots and openings of the plates. The spindle must then be moved linearly to extract its reel support section through the aligned openings. Since it is highly unlikely that the spindles will be moved or positioned in this manner even when the cart is subjected to rough handling, though the spindles are not positively locked in place, they will remain in interlocked assembly with the cart frame structure essentially as shown in FIG. 10. To remove a spindle element from the cart frame structure, the user of the cart will grasp the spindle and first rotate it to align the short pivotal section with the inclined forwardly opening slot and inclined opening. Thereafter, the user will move the spindle upwardly and forwardly, sliding it along the inclined slots and openings of the lock and slide plates while maintaining its substantially horizontal orientation. After this has been done, the user will move the spindle linearly to withdraw the longer reel support section from the aligned slots and holes of the stop and lock plates. Thus, it is not necessary to employ any special tools for assembly or disassembly of the spindles to or from the cart.

For manual handling of the reel support and dispensing cart 190 and for controlled manipulation of the spindle slide plates 236 and 238 a pair of elongate handle arm supports 242 and 244 are fixed by bolt and nut assemblies 246 to the side sections 204 and 206 of the support plate and wheel assembly 200, the bolts extending through connection openings 248. Upper, angulated ends of the elongate handle arm supports 242 and 244 are welded or otherwise fixed to respective handle members 250 and 252 that are each provided with hand-grip elements 254 and 256. Each of the handle arms defines connection apertures 258 for connection thereof to the spindle lock plates at connection opening 260.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

We claim:

1. A manually operated wheeled reel support and dispensing cart for supporting multiple reels of material and for dispensing the material from the reels, comprising:

a cart frame having handles and wheels for manual movement thereof and having spaced frame side members;

a plurality of spindle hinge elements being fixed to one of said frame side members and being disposed in spaced relation, said spindle hinge elements each defining a pivot opening;

a plurality of spindle elements each having a pivot section and a reel retainer section, said pivot sections of said spindle elements extending into said pivot openings for pivotal support of said spindle elements by said spindle hinge elements and being removable from said pivot openings for separation of said spindle elements from said spindle hinge elements, said reel retainer sections each being of sufficient length to bridge the space between said spaced frame side members;

each said spindle element being pivotally moveable within said pivot opening, said spindle element having a closed position securing reels of material on said reel retainer section and a stabilized open position permitting assembly of reels of material to said reel retainer section and removal of reels of material from said reel retainer section, said spindle element in said stabilized open position is restrained against pivotal movement.

2. The manually operated wheeled reel support and dispensing cart of claim 1, comprising:

each of said spindle hinge elements having spindle orienting geometry being engaged by a spindle element for selective positioning of said spindle element at said closed position and at said open position.

3. The manually operated wheeled reel support and dispensing cart of claim 1, comprising:

each of said spindle hinge elements defining at least one spindle positioning recess for receiving a portion of said spindle element therein and for stabilizing said spindle element against rotational movement relative to said spindle hinge element and said cart frame when in said stabilized open position.

4. The manually operated wheeled reel support and dispensing cart of claim 1, comprising:

said spaced frame side members of said cart frame including first and second spaced frame side members;

a spindle stop member being fixed to said first frame side member and defining a plurality of spindle stop recesses each defining a stop shoulder, a portion of one of said spindle elements being located within one of said spindle stop recesses when located at said closed position thereof and having upward movement thereof limited by said stop shoulder; and a spindle locking member being fixed to said second frame side member and defining a plurality of spindle locking recesses releasably receiving end portions of said retainer sections of said spindle elements in retained engagement therein when said spindle elements are at said closed positions thereof.

5. The manually operated wheeled reel support and dispensing cart of claim 1, comprising:

a pair of spindle storage rings being located on said cart frame for storing said spindle elements that have been separated from said spindle hinge elements; and at least one lock element being pivotally supported by said cart frame and being movable from a storage position securing stored spindle elements within said spindle storage rings and a release position permitting removal of stored spindle elements from said spindle storage rings.

6. The manually operated wheeled reel support and dispensing cart of claim 1, wherein each said spindle element is L-shaped.

7. The manually operated wheeled reel support and dispensing cart of claim 1, wherein said spindle element pivot section is perpendicular to said reel retainer section.

8. The manually operated wheeled reel support and dispensing cart of claim 1 comprising:

a spindle locking member being fixed to one of said frame side members and defining a plurality of spindle locking recesses releasably receiving end portions of said retainer sections of said spindle elements in retained engagement therein when said spindle elements are at said closed positions thereof.

9. The manually operated wheeled reel support and dispensing cart of claim 8, comprising:

each of said spindle locking recesses being defined in pan by a hook-like spindle retainer element preventing forward rotation of said spindle element from said locked position thereof.

10. The manually operated wheeled reel support and dispensing cart of claim 9, comprising:

each of said spindle locking recesses being defined in pan by an angulated outer guide edge for guiding said end portions of said retainer sections of said spindle element into said spindle locking recess during pivotal movement of said spindle element to said closed position thereof.

11. A manually operated wheeled reel support and dispensing cart for supporting multiple reels of material and for dispensing the material from the reels, comprising:

a cart frame having handles and wheels for manual movement thereof and having spaced flame side members;

a plurality of spindle hinge elements being fixed to one of said frame side members and being disposed in spaced relation, said spindle hinge elements each defining a pivot opening;

a plurality of spindle elements each having a pivot section and a reel retainer section, said pivot sections of said spindle elements extending into said pivot openings for pivotal support of said spindle elements by said spindle hinge elements and being removable from said pivot openings for separation of said spindle elements from said spindle hinge elements, said reel retainer sections each being of sufficient length to bridge the space between said spaced frame side members;

each of said spindle hinge elements defining at least one spindle positioning recess for receiving a portion of said spindle element therein and for stabilizing said spindle element against rotational movement relative to said spindle hinge element and said cart frame;

said spindle hinge elements having a rear wall being fixed to one or said frame side members having spaced side walls extending from said rear wall and having a front wall spaced from said rear wall and being integral with said side walls, said front wall being of less height than said side walls and defining said spindle positioning recess.

12. A manually operated wheeled reel support and dispensing cart for supporting multiple reels of material and for dispensing the material from the reels, comprising;

a cart frame having handles and wheels for manual movement thereof and having spaced frame side members;

a plurality of spindle hinge elements being fixed to one of said frame side members and being disposed in spaced relation, said spindle hinge elements each defining a pivot opening;

a plurality of spindle elements each having a pivot section and a reel retainer section, said pivot sections of said spindle elements extending into said pivot openings for pivotal support of said spindle elements by said spindle hinge elements and being removable from said pivot openings for separation of said spindle elements from said spindle hinge elements, said reel retainer sections each being of sufficient length to bridge the space between said spaced frame side members;

a spindle stop member being fixed to one of said frame side members and defining a plurality of recesses each being located adjacent one of said spindle hinge elements, said spindle stop member permitting upward movement of a respective spindle element only when the spindle element has been rotated to a predetermined position within its spindle hinge element.

13. A manually operated wheeled reel support and dispensing cart for supporting multiple reels of material and for dispensing the material from the reels, comprising:

a cart frame having handles and wheels for manual movement thereof and having spaced first and second frame side members;

a plurality of pivoting spindle assemblies, each said pivoting spindle assembly comprising:
a hinge element fixed to said first frame side member; and
a spindle element having first and second portions, said first portion joined to said hinge element;

a locking member fixed to said second frame side member, said locking member adapted to releasably engage said second portion of said spindle element;

said spindle element having a closed position securing reels of material on said second portion and a stabilized open position permitting assembly of reels of material to said second portion and removal of reels of material from said second portion, said spindle element in said stabilized open position is restrained against pivotal movement.

14. The cart of claim 13, wherein said spindle elements are prevented from disjoining said hinge elements in said closed position and are allowed to be disjoined from said hinge elements in said open position.

15. The cart of claim 13, wherein each said spindle element Is L-shaped.

16. The cart of claim 13, wherein each said hinge element includes a stabilizer adapted to engage said spindle element and restrain said spindle element from pivotal movement while in said open position.

17. The cart of claim 13, wherein each of said hinge elements defining at least one spindle positioning recess for receiving a portion of said spindle element therein and for stabilizing said spindle element against rotational movement relative to said hinge element and said cart frame while in said open position.

18. The cart of claim 13, wherein said second portion of said spindle element is rotated approximately 90 degrees forwardly of said cart frame in said open position.

19. The cart of claim 13, wherein each said hinge element defines a pivot opening and said first portion of said spindle clement extends into said pivot opening for pivotal support of said spindle element by said hinge element.

20. The cart of claim 19, further comprising a spindle stop member fixed to said first frame side member and located adjacent one or mom of said hinge elements, said spindle stop member preventing removal of said first portion of said spindle clement from said pivot opening in said closed position.

21. A manually operated wheeled reel support and dispensing cart for supporting multiple reels of material and for dispensing the material from the reels, comprising:

a cart frame having a handle and wheels for manual movement thereof and having spaced first and second frame side members;

a plurality of pivoting spindle assemblies, each said pivoting spindle assembly comprising;
a hinge element mounted to said first frame side member; and
a spindle element having firs: end second portions, said first portion removably joined to said hinge element;

a locking member mounted to said second frame side member;

a stop member mounted to said first frame side member, wherein said spindle element has a closed position in which said second portion is received by said locking member, in said closed position said stop member prevents the removal of said spindle element from said hinge element;

said second portion adapted to be released from said locking member and pivot about said first portion pivotally joined to said hinge element to define an open position.

22. The care of claim 21, wherein said spindle element is removable from said hinge element when said spindle element is rotated approximately 90° from the closed position.

* * * * *

UNITED STATES PATENT AND TRADEMARK OFFICE
CERTIFICATE OF CORRECTION

PATENT NO. : 6,877,753 B2
DATED : April 12, 2005
INVENTOR(S) : Jay L. Anderson et al.

It is certified that error appears in the above-identified patent and that said Letters Patent is hereby corrected as shown below:

Column 12,
Line 50, delete the word "pan" and insert the word -- part --
Line 66, delete the word "flame" and insert the word -- frame --

Column 13,
Line 20, delete the word "or" and insert the word -- of --
Line 20, after the word "members", insert -- , --

Column 14,
Line 33, delete the word "mom" and insert the word -- more --
Line 47, delete the word "firs: end" and insert the words -- first and --
Line 62, delete the word "care" and insert the word -- cart --

Signed and Sealed this

Ninth Day of August, 2005

JON W. DUDAS
*Director of the United States Patent and Trademark Office*